United States Patent [19]
Arasmith et al.

[11] Patent Number: 5,667,150
[45] Date of Patent: Sep. 16, 1997

[54] PULVERIZING, FILTERING, AND TRANSPORTING APPARATUS

[76] Inventors: Stanley Dale Arasmith, P.O. Box 2458, Rome, Ga. 30164; Jeffrey Scott Arasmith, 879 Texas Valley Rd., Rome, Ga. 30165

[21] Appl. No.: 532,512

[22] Filed: Sep. 20, 1995

[51] Int. Cl.⁶ ............................................. B02C 7/12
[52] U.S. Cl. ............................ 241/18; 241/55; 241/261.2
[58] Field of Search .................... 241/55, 261, 261.2, 241/261.3, 30, 18

[56] References Cited

U.S. PATENT DOCUMENTS

| | | |
|---|---|---|
| 1,235,030 | 7/1917 | Higginson . |
| 2,510,970 | 6/1950 | Ginaven ........................ 241/261 X |
| 2,988,290 | 6/1961 | Merges .......................... 241/261 |
| 3,028,105 | 4/1962 | Perrine . |
| 3,047,243 | 7/1962 | Meger et al. . |
| 3,451,630 | 6/1969 | Pav . |
| 3,533,567 | 10/1970 | Willems . |
| 3,894,695 | 7/1975 | Benedikter . |
| 4,431,482 | 2/1984 | Heinbockel et al. ............ 241/261 X |
| 4,913,358 | 4/1990 | Sbaschnigg et al. ............ 241/261.2 X |
| 5,060,873 | 10/1991 | Strong ............................ 241/55 |

Primary Examiner—Mark Rosenbaum
Attorney, Agent, or Firm—Jones & Askew

[57] ABSTRACT

A pulverizing apparatus including the use of air, which acts as a reducer, screen, and conveyor, without the need for an external fan or conveyor. A pair of disc assemblies each including a plurality of cutting elements are rotated relative to each other, such that material is processed by shearing and compressive action. After the processing, the reduced material is then blown to a remote location by fan elements attached to at least one of the discs. The apparatus therefore provides a multitude of functions including a "hog" function, a screening function, and a conveying function by the use of air.

10 Claims, 4 Drawing Sheets

PULVERIZING, FILTERING, AND TRANSPORTING APPARATUS

TECHNICAL FIELD

The present invention relates in general to pulverizing methods and apparatuses, and particularly relates to a pulverizing method and apparatus directed towards the use of air as a medium to assist in the pulverization, screening, and subsequent transportation of the processed material, without the need for an external conveyor or for recirculation.

BACKGROUND OF THE INVENTION

For various reasons, there have been various needs in the industry to provide methods and apparatuses for reducing or "pulverizing" objects into relatively smaller objects, in order to provide a more efficient means for using, recycling, or disposing of the reduced objects. Examples of such methods and apparatuses include the reduction of wood into smaller wood fibers while in a water bath, or the reduction of stone into smaller elements.

The known prior art generally falls into two categories: water-based processing and air-based processing. U.S. Pat. No. 3,451,630 to Pay entitled, "Beating Device for the Continuous Processing of Material Stock", illustrates the use of water, in order to process fibrous raw materials. U.S. Pat. No. 3,533,561 to Willems, entitled "Apparatus for Simultaneous Oscillatory Treatment of Substances or Mixtures Thereof", discloses a two-stage kinematically operated high frequency generator, wherein each stage comprises at least a pair of cooperating, relatively rotating rows of members in a common pressure housing between which member of each row of cavities are defined.

Regarding air-based processing, U.S. Pat. No. 1,235,030 to Higginson, entitled "Disintegrating Machine", discloses a disintegrating, pulverizing, crushing, or the like machine within which materials such as minerals, stone, coal, coke, and the like can be reduced to a condition of fine dust or powder. As discussed in its column 2, line 34, the material processed by the Higginson device is ultimately forced by the rotating teeth 14 assisted by gravity and centrifugal into the notches between the teeth of the apparatus.

U.S. Pat. No. 3,028,105 to Perrine, entitled "Multiple Cage Disintegrater", discloses a multiple cage type disintegrater, which uses a series of pins which serve as the movable disintegrater elements, secured at one end to rotatable carrier rings. The unsupported ends of the pins are interconnected and secured in a common ring designed to give stiffness to the assembly. U.S. Pat. No. 3,047,243 to Meger el. al., entitled "Disintegrating Mill" discloses a disintegrating mill for reducing solid granular material to a finer particle size. The material is forced to travel outwardly by centrifugal forces, and as the particles of material move radially outwardly, they are struck by suitable impact means formed on the cages which shatters or disintegrates the material to reduce it to a smaller size. A pair of rotors which each rotate in opposite directions are provided. It may be noted that in Meger, air is intentionally bled from the system by means of a by-pass chute 45. U.S. Pat. No. 3,894,695 to Benedikter, entitled "Disintegrater", discloses the use of two motor driven rotors which rotate in opposite direction in a housing, each of the two rotors carrying at least one circular series of working tools for treating material.

Although the above-referenced prior art includes some advantages, disadvantages and the resulting needs still persist, namely the need to provide a reducing or pulverizing apparatus which reduces, screens, and transports the processed material while maintaining a high rate of production and without the need for a recirculating chamber such as is found in the art.

SUMMARY OF THE INVENTION

The present invention overcomes deficiencies in the prior art by providing a reducing or pulverizing apparatus which reduces, screens, and transports the processed material while maintaining a high rate of production without the need for recirculation.

Generally described, the present invention relates to the use of a pair of cofacing cutting disc assemblies each including a plurality of cutting elements which interact in a concentric manner to facilitate materials processing therethrough. A plurality of fan elements are positioned on one of the cutting disc assemblies to provide air flow as well as a screening function.

Therefore, it is an object of the present invention to provide an improved pulverizing or reducing apparatus.

It is a further object of the present invention to provide a method and apparatus for reducing wood such as stumps, brush, etc. into more manageable "chips".

It is a further object of the present invention to provide a reducing apparatus which is cost-effective to manufacture.

It is a further object of the present invention to provide a reducing apparatus which is cost-effective to operate.

It is a further object of the present invention to provide a reducing apparatus which is simple to operate.

It is a further object of the present invention to provide a reducing apparatus which is capable of a relatively high volume.

It is a further object of the present invention to provide a reducing apparatus which is capable of reducing a wide variety of material.

It is a further object of the present invention to provide a reducing apparatus which includes the use of easily-replaceable cutting elements.

It is a further object of the present invention to provide a method and apparatus for reducing biomass.

It is a further object of the present invention to provide a method and apparatus for processing scrap material such as rubber.

It is a further object of the present invention to provide a method and apparatus for processing waste products.

It is a further object of the present invention to provide an improved method and apparatus for processing materials which provides a consistent and uniform processed product.

It is a further object of the present invention to provide a pulverizing apparatus which does not require the use of an externally-mounted air blower.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
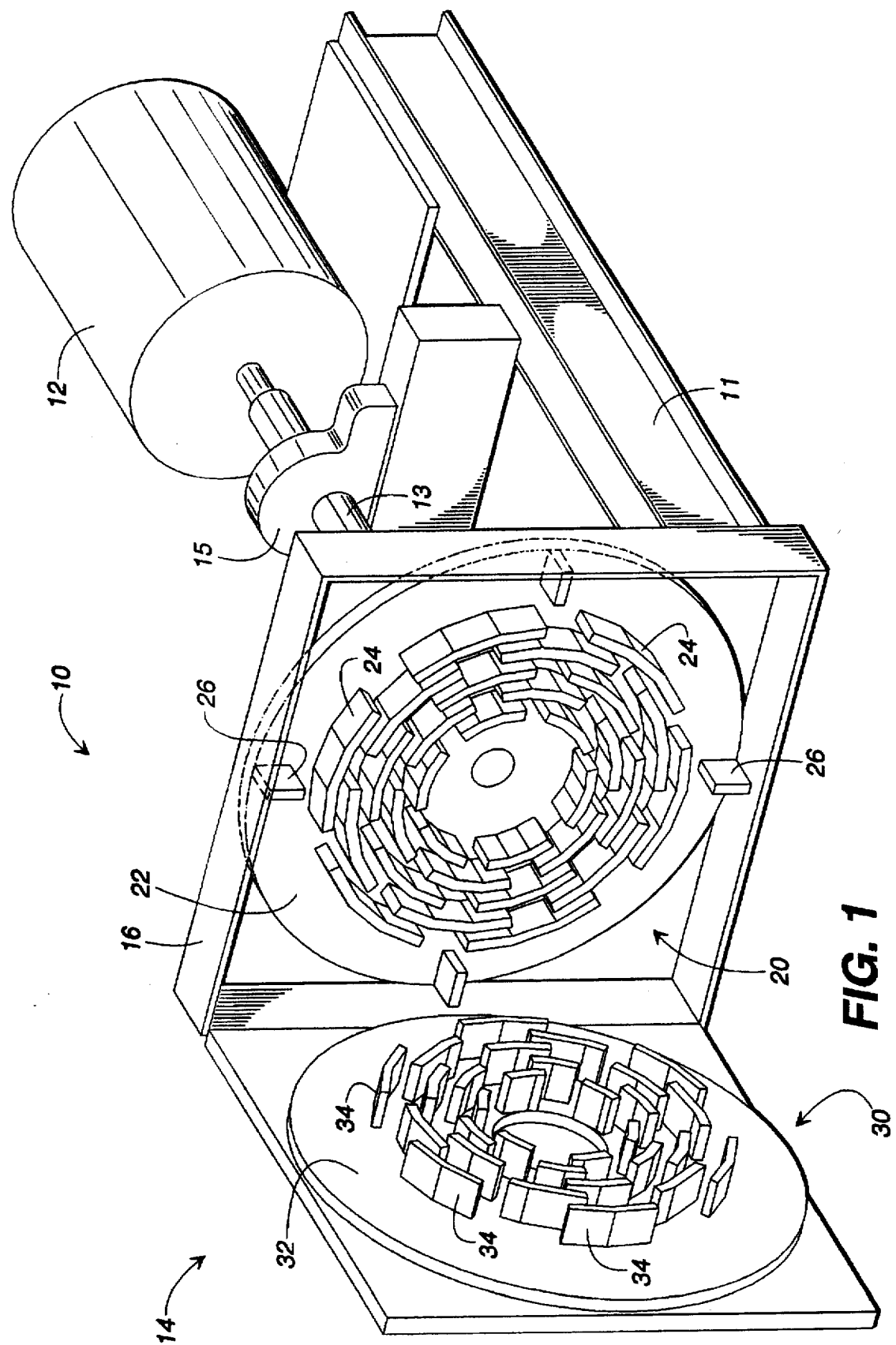
FIG. 1 is a pictorial view of an apparatus 10 according to one embodiment of the present invention, with its cutting enclosure open to illustrate the stationary and rotating cutting disk assemblies therein.

Referring now to the drawings, in which like numerals designate like elements throughout the several views.

General Operation

Reference is now made to FIG. 1. As may be seen, an apparatus 10, according to the present invention generally includes an enclosed cutting chamber assembly 14, and a drive means 12 driving a substantially horizontal shaft 13 supported by a bearing 15. The shaft 13 is rotatably mounted relative to the frame 11 of the apparatus 10, and transfers power through torque to the cutting chamber assembly 14. As discussed in later detail, material to be processed is introduced to the cutting chamber assembly 14, processed by the cutting chamber assembly 14, and thereafter discharged by the cutting chamber assembly 14 into processed material. Also as discussed in later detail, the cutting chamber assembly 14 acts not only as a pulverizer or "hog", but also acts as a sizing screen or grate, and also acts as a downstream material conveyor by the use of air provided by fan elements within the cutting chamber assembly 14.

The cutting chamber assembly 14 includes a cover 16, and two concentrically-intermeshing cutting disc assemblies 20, 30. Each of the cutting disc assemblies 20, 30, includes a generally planar support disc 22, 32, respectively, with processing elements 24, 34, respectively (which also may be referred to as "cutting elements" 24, 34), being rigidly and concentrically mounted onto a common face of each of the supporting discs. The cutting elements intermesh in a cooperating concentric manner to facilitate controlled reduction of material passing therethrough in a manner discussed in further detail below.

The cutting disc assembly 20 is a rotating cutting assembly, and is mounted to the end of shaft 13 and rotatably driven by said shaft. Cutting disc assembly 30 is a stationary disc assembly, and is mounted to the inside of the enclosure. Therefore, it may be understood that the cutting elements mounted to the stationary cutting disc assembly 30 do not move and are likewise stationary throughout the processing.

Operation of the apparatus 10 is generally as follows. Material is introduced into the input chute 19 by a conveyor (not shown) or other suitable means (including hand feeding). This material is then impacted by the innermost rotating cutting element and sheared or otherwise reduced between the innermost rotating cutting members and its adjacent stationary cutting element "neighbors". The material continues to be drawn radially outwardly through the apparatus, being sheared, compressed, impacted, or otherwise reduced between the rotating cutting elements and the stationary cutting elements. The circumferential spacing between the cutting elements for a given "ring" provides a "screen" effect which allows the apparatus to provide a substantially predictable processed particle size, without the need for recirculation. After the material has been processed, it then can be "blown" to a remote location by air provided by fan elements such as 26 mounted to the rotating disc, through an output tube such as 18 shown in FIG. 2A. An output tube is now shown in FIG. 1, but it should be understood that it would be possible to position such an outlet tube in the proximity of any of the four "corners" of the rectangularly-shaped enclosure "or cover 16".

Figure 2B:
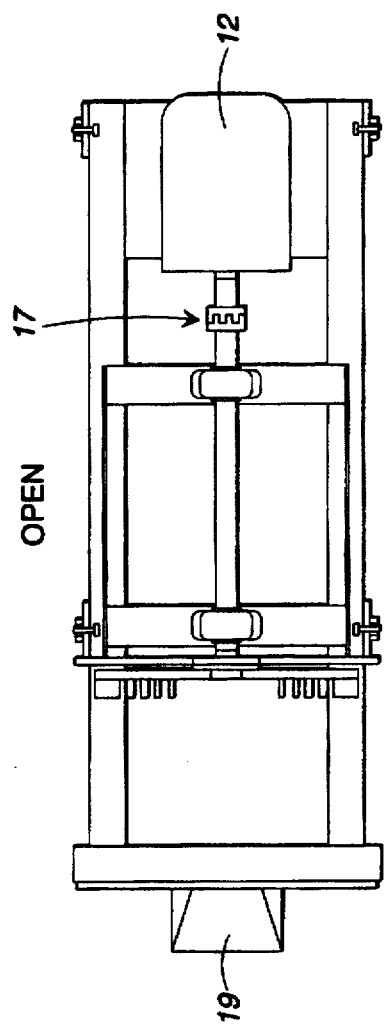
FIGS. 2A, 2B, and 2C are related end, top, and side elevational views of a second embodiment of the present invention, which includes the use of a linearly movable motor/shaft/rotating disc assembly in its "OPEN" position in FIG. 2B, and in its "CLOSED" position in FIG. 2C.
Figure 2C:
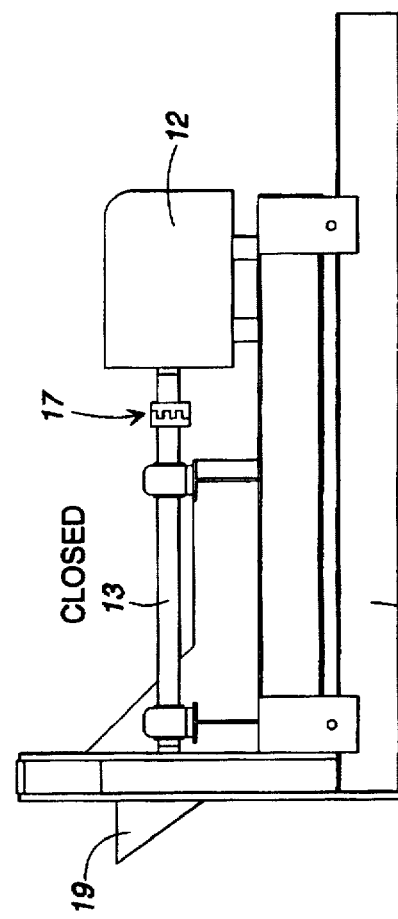
Figure 2A:
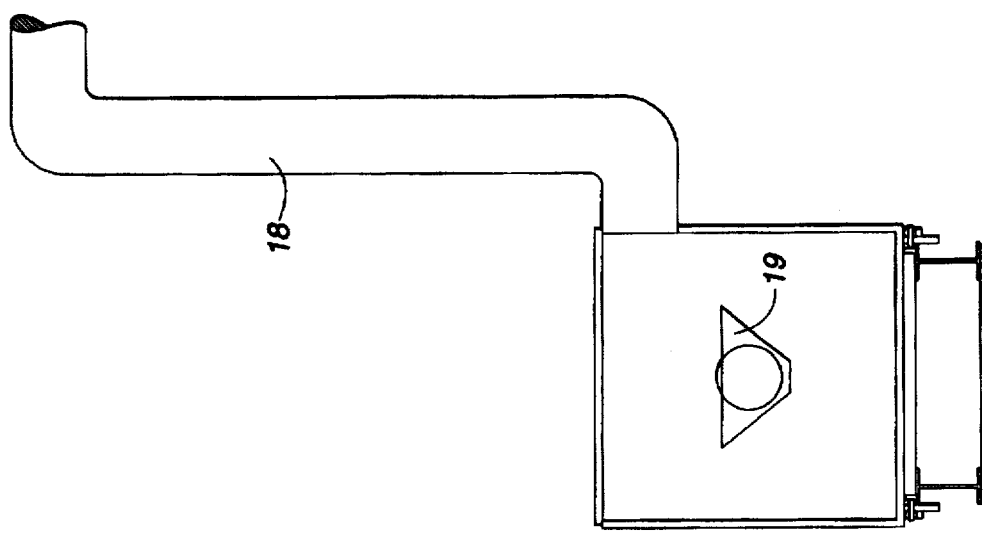

Referring now to FIGS. 2A-2C, a similar configuration similar to that of FIG. 1 is shown, except that an output tube 18 is shown, and an alternate means for providing access to the cutting chamber assembly is likewise shown. This alternate access means is provided by the use of a rail system which allows the motor 12, shaft 13 (having a coupling 17), and the rotating disc assembly to be commonly moved in a linear fashion away from the stationary curing disc.

Layouts

As discussed above, the cutting disc assemblies 20, 30, respectively, each support a plurality of cutting elements 24, 34, which interact to provide controlled processing of material introduced within the cutting chamber assembly 14. Under the present invention many different cutting element layouts may be provided. As under the present invention the cutting disc assemblies 20, 30 can be changed, different cutting element layouts can be used. For example, a user could have a single apparatus, with a plurality of discs available to provide him with a variety of particle sizing choices. As discussed in later detail, the blades themselves may also be changed for a given cutting disc assembly.

Figure 4:
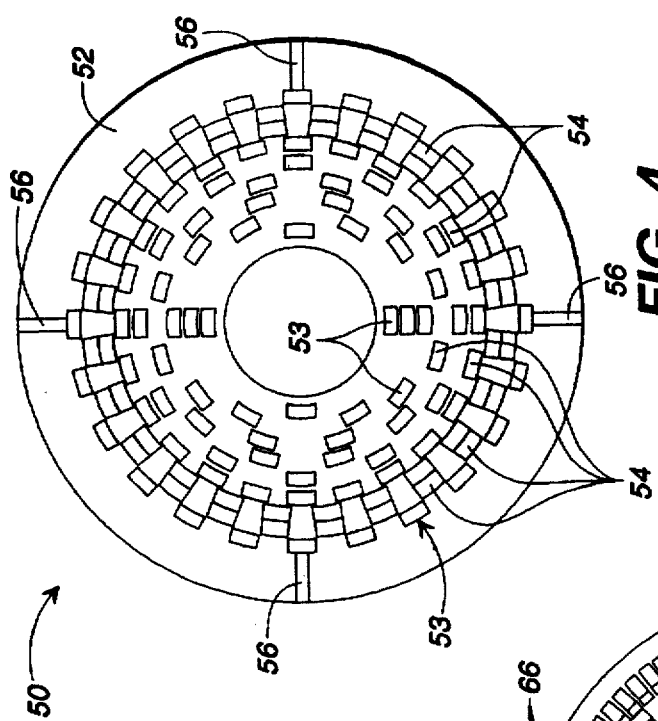
FIG. 4 is an illustration of a "not closed, not narrowing" relationship between moving cutting members and stationary cutting members within a cutting enclosure (not shown).
Figure 5:
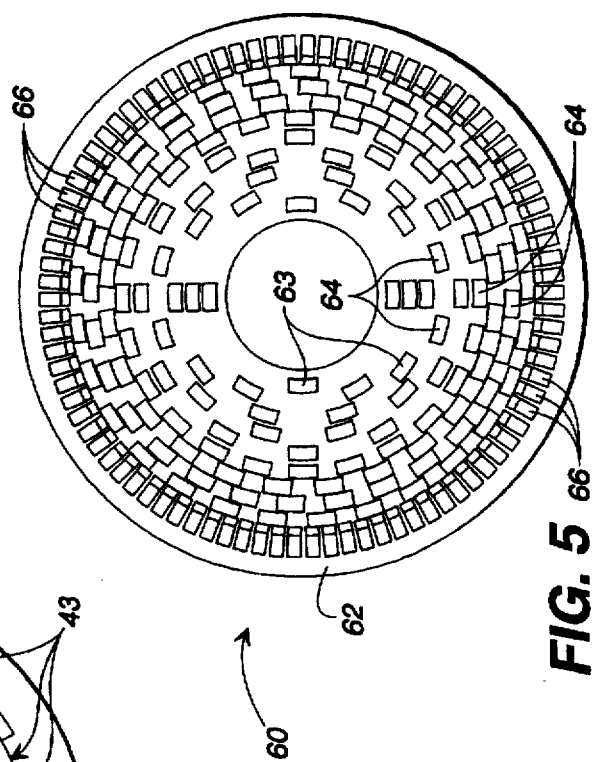
FIG. 5 is an illustration of a "not totally closed, not narrowing" relationship between moving cutting members and stationary cutting members within a cutting enclosure (not shown).
Figure 3:
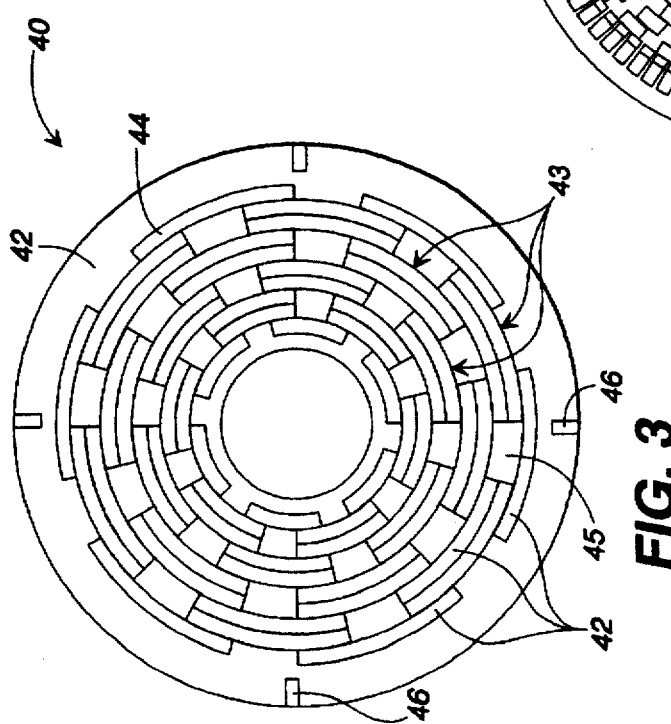
FIG. 3 is an illustration of a "closed" relationship between moving cutting members and stationary cutting members within a cutting enclosure (not shown).

Reference is now generally made to FIGS. 3, 4, and 5, which illustrate various configurations in which the cutting elements mounted upon the mounting disc may interact. Generally speaking, the processing apparatuses according to the present invention fall generally into two classes: "closed", and "not closed". FIG. 3 shows a "closed" configuration. Within the "not closed" classification, there is a subclassification of the apparatuses into "uniform spacing" and "non-uniform spacing" classes. FIG. 4 shows a "not closed, narrowing" configuration, and FIG. 5 shows a "not closed, not narrowing" configuration.

Reference is now particularly made to FIG. 3, which illustrates an exemplary rotating cutting disc assembly 40 in cooperation with stationary cutting elements 43 (shown in solid black) which are attached to a stationary cutting disc (not shown). The rotating cutting disc assembly 40 includes a rotating disc 42 having a plurality of cutting elements 44 (shown in white) mounted thereon. As discussed above, it may be considered a "closed" configuration, in that substantially discrete "cavities" such as 45 are defined by the intercooperation of the moving cutting elements 42 and the stationary cutting elements and the presence of the two cofacing surfaces of the stationary and rotating discs. Fan elements 46 are also attached to the rotating cutting disc 42, and provide air flow upon rotation of the rotating cutting disc assembly.

Reference is now particularly made to FIG. 4, which illustrates an exemplary rotating disc assembly 50 in cooperation with stationary cutting elements 53 (shown in solid black) which are attached to a stationary cutting disc (not shown). The rotating cutting disc assembly 50 includes a rotating disc 52 having a plurality of cutting elements 54 (shown in white) mounted thereon. Fan elements 56 are also attached to the rotating cutting disc 52, and provide air flow upon rotation of the rotating cutting disc assembly, and to also provide a cutting action due to their close proximity to the outermost stationary cutting elements.

Reference is now particularly made to FIG. 5, which illustrates an exemplary rotating disc assembly 60 in cooperation with stationary cutting elements 63 (shown in solid black) which are attached to a stationary cutting disc (not shown). The rotating cutting disc assembly 60 includes a rotating disc 62 having a plurality of cutting elements 64 (shown in white) mounted thereon. Fan elements 66 are also attached to the rotating cutting disc 52, and provide air flow upon rotation of the rotating cutting disc assembly. It may be understood that this is a "narrowing"-type configuration in that the gaps between the "rings" of cutting elements tend to become smaller as the rings get larger. This provides an advantageous "screening" effect. It may also be understood that the close positioning of the peripheral fan elements 66 provides a "screening" function as well as an air impelling function.

Mounting Configurations

Figure 6:
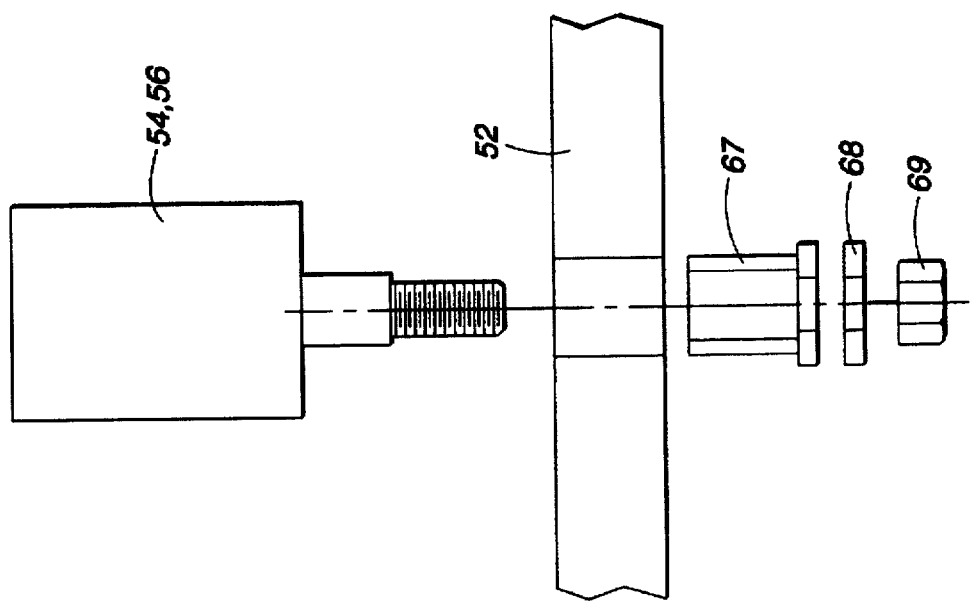
FIG. 6 is an exploded view of a cutting member configured for mounting relative to a movable or stationary disc.

Reference is now particularly made to FIG. 6, which illustrates a means for attaching either exemplary cutting elements 54 or fan elements 56 to an exemplary supporting disc 52. In the exemplary supporting disc 52, a hole is provided therethrough. A mounting bushing 67 is thereafter welded or otherwise fastened within the cavity. The mounting bushing 67 provides a means for mounting a cutting element such as cutting elements 54 or fan elements 56. A cutting element 54 can include a threaded portion to allow it to be attached to the disc 52 by means of a nut 69 or other suitable fastening means with or without the use of an accompanying washer 68. Therefore, it may be understood that by removing the nut 69, the cutting (or fan) element may be readily removed from the location within the mounting bushing. Therefore, this allows for ready installation and removal of cutting elements. This is a need, due to their potential for wear.

It should be understood that an alternative to the mounting configuration above is to weld the cutting elements to the associated supporting disc, if easy replaceability is not important or desired.

Bridges

Figure 7:
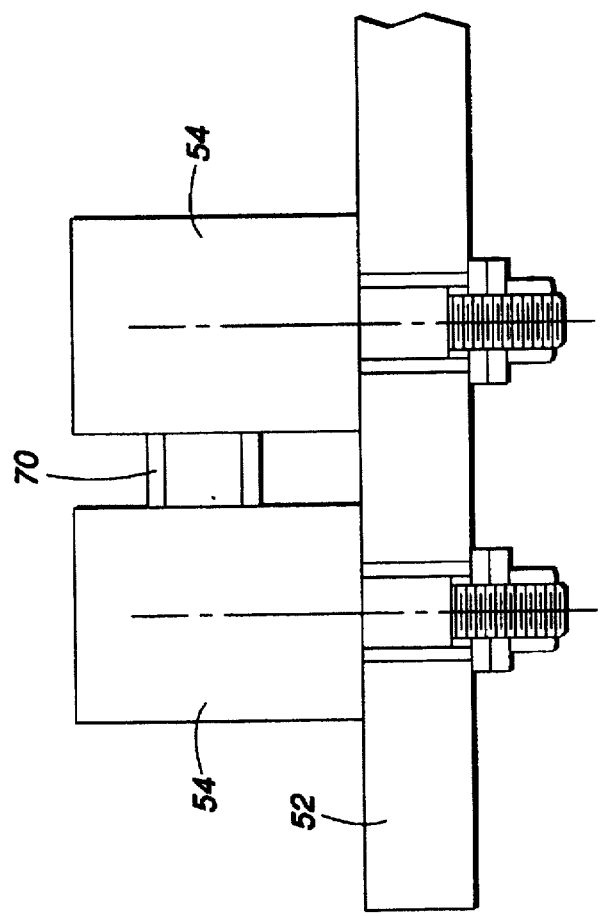
FIG. 7 is an assembled view of a pair of cutting members according to the present invention, which include bridging elements spanning the gap between the two cutting members.

Reference is now particularly made to FIG. 7, which illustrates the use of a pair of cutting elements such as 54 with a pair of "bridge" elements which traverse the gap between the cutting elements. Such restrictions may be provided between stationary or rotating cutting elements, and may be understood to further limit particle size when passing thereby. The mounting scheme discussed in reference to FIG. 7 is again illustrated in an "assembled" mode.

Alternatives

It should be understood that it is possible to modify or supplement the embodiments shown in the above-discussed figures to include additional features. For example, a control clearance" may be may be used, in which a certain amount of desired spacing above and beyond the necessary machine tolerances is provided between the rotating cutting elements and the stationary cutting elements, in order that some material may pass between the gaps. A "wedge" feature may also be used, which uses an inclined or tapered cutting element which actually forces the material back or forward. Serrations or "teeth" may be provided on one or both of the major planar surfaces of the cutting members, in order to provide a radial grinding effect.

It may also be understood that the arcuately-shaped cutting members shown in some of the figures may be provided by rolling or bending elongate bar stock material, or the arcuate shaping could be approximated by the use of a number of discrete, straight, elements lined up end-to-end to provide an approximate arcuate shape.

Uses

The "material" capable of being passed through the apparatus includes biomass, grains, fiberglass, rubber tires, plastics, trash, wood, carpet, and paper.

Materials

Materials used for the cutting elements may include high speed steel, carbide, "chipper grade" steel, 4340 steel, or other materials known in the art. The remaining components (e.g. the disc, shaft, etc.) may be composed of materials known in the art, but suitable steels again may be preferred.

Conclusion

While this invention has been described in specific detail with reference to the disclosed embodiments, it will be understood that many variations and modifications may be effected within the spirit and scope of the invention as described in the appended claims.

What is claimed is:

1. An apparatus using air as a medium in the reducing, screening, and transporting of a material, said apparatus comprising:

A) a frame;

B) a rotating disc assembly rotatably mounted about a first axis relative to said frame, said rotating disc assembly itself comprising:

1) a rotating disc having a first side;

2) a plurality of cutting elements mounted to said first side and grouped into at least one ring having spaces therebetween; and 3) a plurality of fan elements mounted on said first side and about the periphery of said rotating disc, said fan elements having a radial dimension greater than their circumferential dimension and configured to blow air at least partially radially with respect to said first axis; and C) a stationary cutting assembly fixed relative to said frame, said stationary cutting assembly itself comprising:

1) a support member having a first side; and 2) a plurality of cutting elements mounted to said first side of said stationary cutting member and grouped into at least one ring having spaces therebetween, said rotating disc assembly and said stationary cutting assembly being movably mounted relative to each other such that the cutting elements of said rotating cutting disc assembly are in a concentric relationship with said cutting elements of said stationary cutting assembly in order to provide a reducing function along a material flow path transversing each of said cutting element rings and said fan elements provide said air blowing function to assist flow of the material along said material flow path by making it airborne at least somewhere along the path, and also provide said screening function.

2. The apparatus as claimed in claim 1, further comprising a chute positioned on the outside of said housing and underneath said inlet hole, said chute configured to assist the introduction of said material into said hole from the atmosphere.

3. The apparatus as claimed in claim 1, wherein said fan blades of said apparatus are substantially elongate and positioned on said rotating disc assembly such that their longitudinal axis are radially oriented with respect to the rotational axis of said.

4. An apparatus using air as a medium in the reducing, screening, and transporting of a material, said apparatus comprising:

A) a frame;

B) a rotating disc assembly rotatably mounted about a first axis relative to said frame, said rotating disc assembly itself comprising:
1) a rotating disc having a first side;
2) a plurality of cutting elements mounted to said first side of said rotating disc and grouped into a plurality of concentric rings each having spaces between cutting elements for a given ring; and
3) a plurality of fan elements mounted on said first side and about the periphery of said rotating disc, said fan elements having a radial dimension greater than their circumferential dimension and configured to blow air at least partially radially with respect to the rotational said first axis and also spaced apart a distance sufficient to provide a blowing as well as a screening function for material passing therethrough; and C) a stationary cutting assembly fixed relative to said frame, said stationary cutting assembly itself comprising:
1) a support member having a first side; and
2) a plurality of cutting elements mounted to said first side of said stationary cutting assembly and grouped into a plurality of concentric rings each having spaces between cutting elements for a given ring, said first disc assembly and said stationary cutting assembly being movably mounted relative to each other such that the cutting elements of said rotating disc assembly are in an alternating concentric relationship with said cutting elements of said stationary cutting assembly in order to provide a reducing function along a material flow path transversing each of said cutting element rings and such that the fans provide a blowing function to assist flow of the material along said material flow path by carrying it in an airborne manner at least somewhere along the path, and also provide said screening function.

5. The apparatus as claimed in claim 4, wherein said cutting elements of said rotating disc assembly and said stationary cutting assembly are configured to provide a shearing action of said material when said rotating disc assembly is rotated relative to said stationary cutting assembly.

6. The apparatus as claimed in claim 4, wherein said assembly is configured to provide a reducing, screening, and conveying function during the rotation of said rotating disc assembly.

7. The apparatus as claimed in claim 4, further comprising at least one bridging member spanning between two of said commonly-mounted cutting elements.

8. An apparatus using air as a medium in the reducing, screening, and transporting of a material, said apparatus comprising:

A) a frame;

B) a rotating disc assembly rotatably mounted about a first axis relative to said frame, said rotating disc assembly itself comprising:
1) a rotating disc having a first side;
2) a plurality of cutting elements mounted to said first side; and
3) a plurality of fan elements mounted on said first side and about the periphery of said rotating disc, said fans having a radial dimension greater than their circumferential dimension and configured to blow air at least partially radially with respect to said first axis; and C) a stationary cutting assembly fixed relative to said frame, said stationary cutting assembly itself comprising:
1) a support member having a first side; and
2) cutting elements mounted to said first side, said first disc assembly and said second disc assembly being movably mounted relative to each other such that the cutting elements provide a reducing function along a material flow path therebetween and the fans provide a blowing function to assist flow of the material along said material flow path by making it airborne at least somewhere along the path.

9. A method of reducing, screening, and transporting material, said method including the steps of:

A) providing a frame;

B) providing a rotating disc assembly rotatably mounted about a first axis relative to said frame, said rotating disc assembly itself comprising:
1) a rotating disc having a first side;
2) a plurality of cutting elements mounted to said first side; and
3) a plurality of fan elements mounted on said first side and about the periphery of said rotating disc, said fan elements having a radial dimension greater than their circumferential dimension and configured to blow air at least partially radially with respect to the rotational axis of said rotating disc assembly; and C) providing a stationary cutting assembly fixed relative to said frame, said stationary cutting assembly itself comprising:
1) a support member having a first side; and
2) cutting elements mounted to said first side, said first disc assembly and said second disc assembly being movably mounted relative to each other such that said cutting elements provide a reducing function along a material flow path therebetween and said fan elements provide an air blowing function to assist flow of the material along said material flow path;

D) causing said rotating disk assembly to rotate relative to said stationary cutting assembly; and E) placing material into said material flow path such that it becomes airborne along the path and is reduced and transported.

10. The method as claimed in claim 9, further comprising the step of placing such material into an inlet chute attached relative to said stationary cutting assembly to facilitate its introduction into the material flow path.

* * * * *